(12) United States Patent
Quach et al.

(10) Patent No.: US 11,220,917 B1
(45) Date of Patent: Jan. 11, 2022

(54) DIFFUSED COOLING ARRANGEMENT FOR GAS TURBINE ENGINE COMPONENTS

(71) Applicant: Raytheon Technologies Corporation, Farmington, CT (US)

(72) Inventors: San Quach, Southington, CT (US); Raymond Surace, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/010,904

(22) Filed: Sep. 3, 2020

(51) Int. Cl.
*F01D 5/18* (2006.01)
*F01D 9/06* (2006.01)
*F01D 25/12* (2006.01)

(52) U.S. Cl.
CPC .............. *F01D 5/186* (2013.01); *F01D 9/065* (2013.01); *F01D 25/12* (2013.01); *F05D 2240/12* (2013.01); *F05D 2240/303* (2013.01); *F05D 2240/81* (2013.01); *F05D 2260/202* (2013.01)

(58) Field of Classification Search
CPC .......... F01D 5/186; F01D 9/065; F01D 25/12; F05D 2240/12; F05D 2240/303; F05D 2240/81; F05D 2260/202
See application file for complete search history.

(56) References Cited

U.S. PATENT DOCUMENTS

| | | | | |
|---|---|---|---|---|
| 4,762,464 A | * | 8/1988 | Vertz | B23P 15/02 416/97 R |
| 5,458,461 A | * | 10/1995 | Lee | F01D 5/186 415/115 |
| 6,099,251 A | * | 8/2000 | LaFleur | F01D 5/186 416/97 R |
| 6,210,112 B1 | * | 4/2001 | Tabbita | F01D 5/186 416/97 R |
| 6,241,468 B1 | * | 6/2001 | Lock | F01D 5/186 415/115 |
| 6,368,060 B1 | * | 4/2002 | Fehrenbach | F01D 5/186 416/97 A |
| 6,547,524 B2 | | 4/2003 | Kohli et al. | |
| 6,629,817 B2 | | 10/2003 | Shelton et al. | |
| 8,875,393 B2 | | 11/2014 | Camhi et al. | |
| 9,376,919 B2 | | 6/2016 | Fujimoto | |
| 9,890,647 B2 | | 2/2018 | Chamberlain et al. | |
| 10,233,775 B2 | * | 3/2019 | Bunker | F01D 25/12 |
| 10,598,379 B2 | | 3/2020 | Cunha et al. | |
| 2016/0298462 A1 | | 10/2016 | Thornton et al. | |

FOREIGN PATENT DOCUMENTS

CN 204663588 9/2015

* cited by examiner

*Primary Examiner* — Igor Kershteyn
(74) *Attorney, Agent, or Firm* — Carlson, Gaskey & Olds, P.C.

(57) ABSTRACT

A gas turbine engine component according to an example of the present disclosure includes, among other things, an external wall extending in a thickness direction between first and second wall surfaces. The first wall surface bounds an internal cavity, and establishes at least one surface depression along an external surface contour. The external wall includes at least one cooling passage having an outlet port established along the at least one surface depression. A method of fabricating a gas turbine engine component is also disclosed.

21 Claims, 8 Drawing Sheets

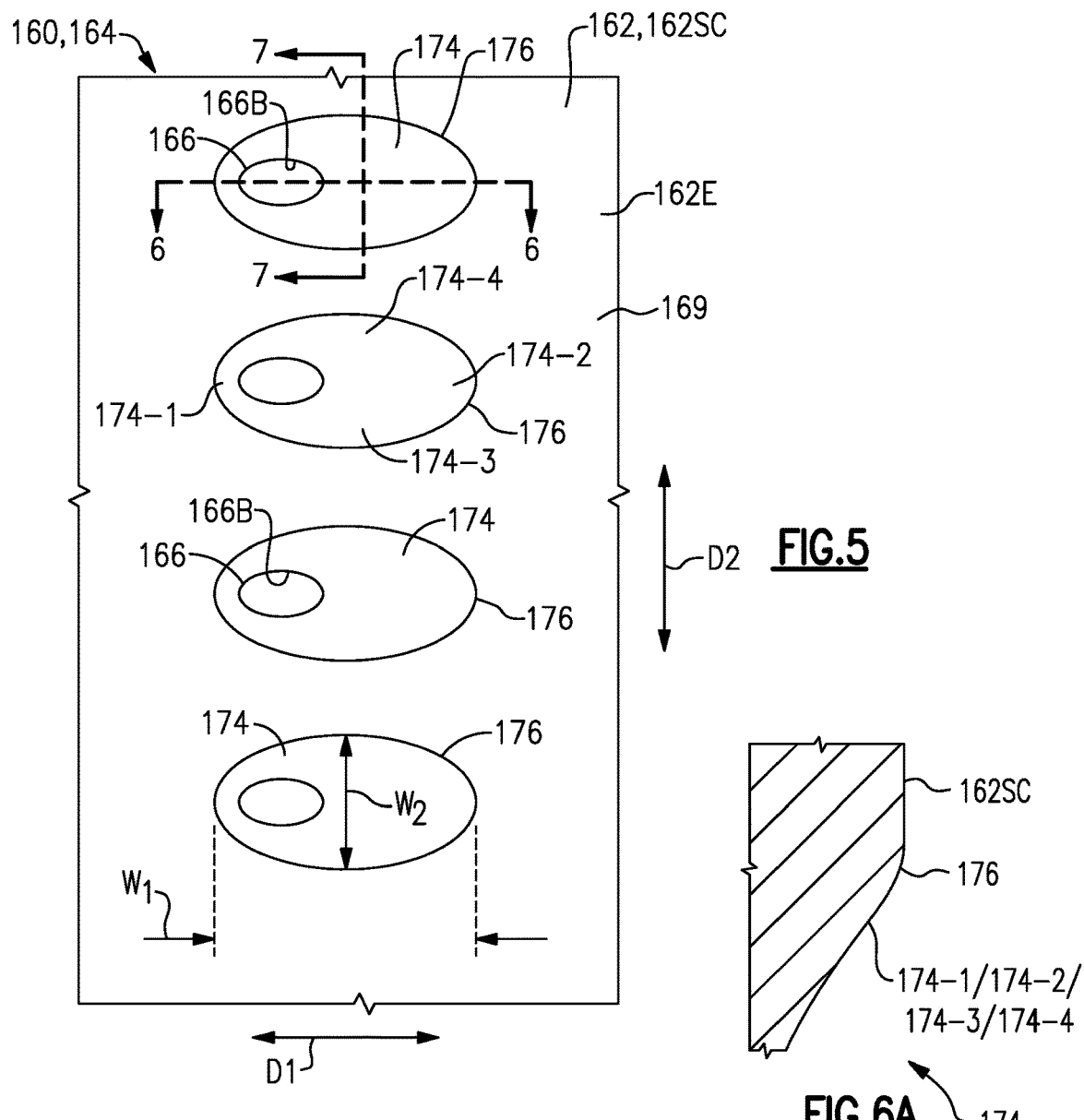
FIG.5
FIG.6A
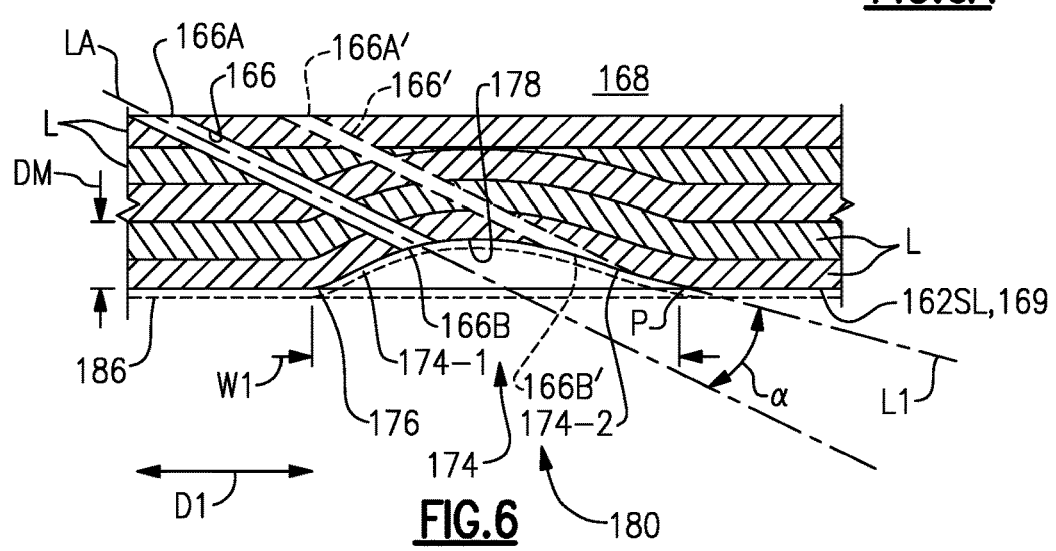
FIG.6

DIFFUSED COOLING ARRANGEMENT FOR GAS TURBINE ENGINE COMPONENTS

BACKGROUND

This disclosure relates to cooling for a component, such as a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream through a turbine driving turbine blades. Static vanes are positioned adjacent to the turbine blades to control the flow of the products of combustion. The blades and vanes are subject to extreme heat, and thus cooling schemes are utilized for each.

Some cooling schemes may employ cooling passages with diffusers to convey diffused cooling for cooling portions of the component.

SUMMARY

A gas turbine engine component according to an example of the present disclosure includes an external wall extending in a thickness direction between first and second wall surfaces. The first wall surface bounds an internal cavity, and establishes an external surface contour and at least one surface depression along the external surface contour. The at least one surface depression has a concave geometry established by upstream and downstream arcuate faces sloping inwardly from opposed sides of a rim along the external surface contour to join at a valley. The valley is established at a maximum depth of the at least one surface depression relative to the rim. The external wall includes at least one cooling passage extending along a longitudinal axis between an inlet port and an outlet port. The outlet port is established along the upstream face of the at least one surface depression. The at least one cooling passage is oriented such that a projection of the longitudinal axis has a component that extends in a direction towards the downstream face. The at least one surface depression expands outwardly from the valley to establish a diffuser, and the at least one cooling passage interconnects the internal cavity and the diffuser.

In a further embodiment of any of the foregoing embodiments, the component is an airfoil. The airfoil includes an airfoil section extending in the chordwise direction between a leading edge and a trailing edge, and the outlet port is situated along the at least one surface depression between the valley and the leading edge of the airfoil section with respect to the chordwise direction.

In a further embodiment of any of the foregoing embodiments, the external wall comprises a ceramic matrix composite including a plurality of ply layers in stacked relationship, and the plurality of ply layers follow the external surface contour to establish the at least one surface contour.

In a further embodiment of any of the foregoing embodiments, the rim of the at least one surface depression has a substantially elliptical geometry that extends in a first direction between the upstream arcuate face and the downstream arcuate face to establish a first width and extends in a second direction between opposed sidewalls to establish a second width. The second direction is perpendicular to the first direction, and the at least one surface depression is dimensioned such that the maximum depth is less than both the first and second widths.

In a further embodiment of any of the foregoing embodiments, the first width is a minimum distance across the rim and the second width is a maximum distance across the rim.

In a further embodiment of any of the foregoing embodiments, the upstream face and downstream face establish a first width along the rim, opposed faces of the at least one surface depression establish a second width along the rim, and the at least one surface depression is elongated such that the first width is greater than the second width.

In a further embodiment of any of the foregoing embodiments, the at least one cooling passage includes a plurality of cooling passages, the at least one surface depression is a plurality of surface depressions distributed along the external wall, and each surface depression of the plurality of surface depressions is coupled to the outlet port of a respective one of the plurality of cooling passages.

In a further embodiment of any of the foregoing embodiments, each surface depression of the plurality of surface depressions circumscribes only one outlet port of the plurality of cooling passages.

In a further embodiment of any of the foregoing embodiments, the at least one surface depression is a single continuous surface depression coupled to the outlet ports of the plurality of cooling passages.

In a further embodiment of any of the foregoing embodiments, a cross section of the rim has a convexly shaped geometry that interconnects the respective upstream and downstream faces and the external surface contour.

In a further embodiment of any of the foregoing embodiments, the gas turbine engine component is an airfoil including an airfoil section extending from a platform section.

A gas turbine engine according to an example of the present disclosure includes an array of blades and an array of vanes spaced axially from the array of blades in a gas path, the array of blades rotatable in the gas path, and an array of blade outer air seals (BOAS) arranged about the array of blades to bound the gas path. At least one of the array of blades, the array of vanes and the array of BOAS includes an external wall extending in a thickness direction between first and second wall surfaces, the first wall surface bounding an internal cavity, and the external wall surface establishing an external surface contour and at least one surface depression along the external surface contour. The at least one surface depression has a concave geometry established by upstream and downstream faces that slope inwardly from opposed sides of a rim along the external surface contour to join at a valley. The valley is established at a maximum depth of the at least one surface depression relative to the rim. The external wall includes at least one cooling passage extending along a longitudinal axis between an inlet port and an outlet port. The outlet port is established along the upstream face of the at least one surface depression. The at least one cooling passage is oriented such that a projection of the longitudinal axis has a component that extends in a direction towards the downstream face. The at least one surface depression expands outwardly from the valley to establish a diffuser, and the at least one cooling passage interconnects the internal cavity and the diffuser.

In a further embodiment of any of the foregoing embodiments, the component is an airfoil. The airfoil includes an airfoil section extending in a chordwise direction between a leading and trailing edge, and the outlet port is established between the valley and the leading edge with respect to the chordwise direction.

In a further embodiment of any of the foregoing embodiments, the rim of the at least one surface depression has a substantially elliptical geometry that extends in a first direction between an upstream edge and a downstream edge to establish a first width and extends in a second direction between opposed sidewalls of the at least one surface depression to establish a second width. The second direction perpendicular to the first direction, and the at least one surface depression is dimensioned such that the maximum depth is less than the first width and is less than the second width.

In a further embodiment of any of the foregoing embodiments, a reference line interconnects the valley and a point along the rim associated with the first width, and an angle is defined between the longitudinal axis relative to the reference line. The angle is less than or equal to 15 degrees.

In a further embodiment of any of the foregoing embodiments, the at least one surface depression includes a plurality of surface depressions spaced apart along the external wall.

In a further embodiment of any of the foregoing embodiments, the upstream face and downstream face establish a first width along the rim, opposed faces of the at least one surface depression establish a second width along the rim, and the surface depression is elongated such that the first width differs from the second width.

In a further embodiment of any of the foregoing embodiments, the at least one cooling passage includes a plurality of cooling passages. The at least one surface depression is a plurality of surface depressions spaced apart along the external wall to establish the external surface contour, and each surface depression of the plurality of surface depressions circumscribes only one outlet of the plurality of cooling passages.

A method of fabricating a gas turbine engine component according to an example of the present disclosure includes arranging one or more plies along tooling to establish a ply layup including at least one surface depression that complements a raised protrusion along the tooling, debulking the ply layup to establish a laminate preform, and densifying the laminate preform to establish a wall of a gas turbine engine component including a surface contour. The at least one surface depression is established along the surface contour, and the at least one surface depression has a concave geometry established by upstream and downstream faces that slope inwardly from opposed sides of a rim along the surface contour to join at a valley. The valley is established at a maximum depth of the at least one surface depression relative to the rim. The method includes forming at least one cooling passage that interconnects the at least one surface depression and an internal cavity. The at least one cooling passage extends along a longitudinal axis between an inlet port and an outlet port. The outlet port is established along the upstream face. The at least one cooling passage is oriented such that a projection of the longitudinal axis has a component that extends in a direction towards the downstream face. The at least one surface depression expands outwardly from the valley to establish a diffuser, and the at least one cooling passage interconnects the internal cavity and the diffuser.

In a further embodiment of any of the foregoing embodiments, the gas turbine engine component is an airfoil, the one or more ply layers includes a plurality of ply layers in stacked relationship to establish the ply layup, and the step of densifying the laminate preform establishes a ceramic matrix composite (CMC).

In a further embodiment of any of the foregoing embodiments, the step of forming the at least one cooling passage includes forming the passage with a sacrificial member or machining the at least one cooling passage into the upstream face of the at least one surface depression.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 5 illustrates a view of the cooling arrangement taken along region 5-5 of FIG. 3.
FIG. 6 illustrates a sectional view taken along line 6-6 of FIG. 5.
FIG. 6A illustrates aspects of the cooling arrangement of FIG. 6.

DETAILED DESCRIPTION

Figure 1:
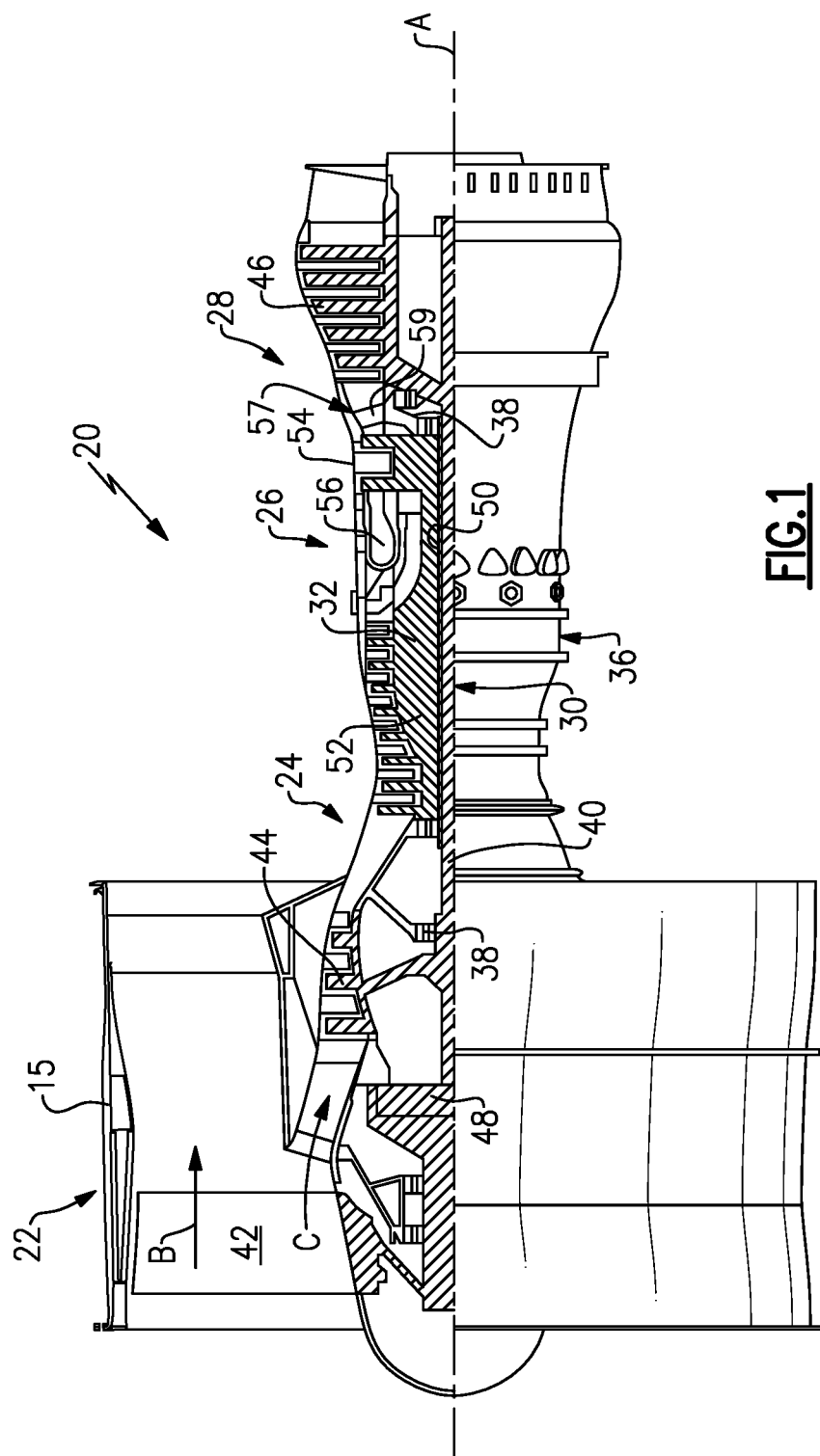
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
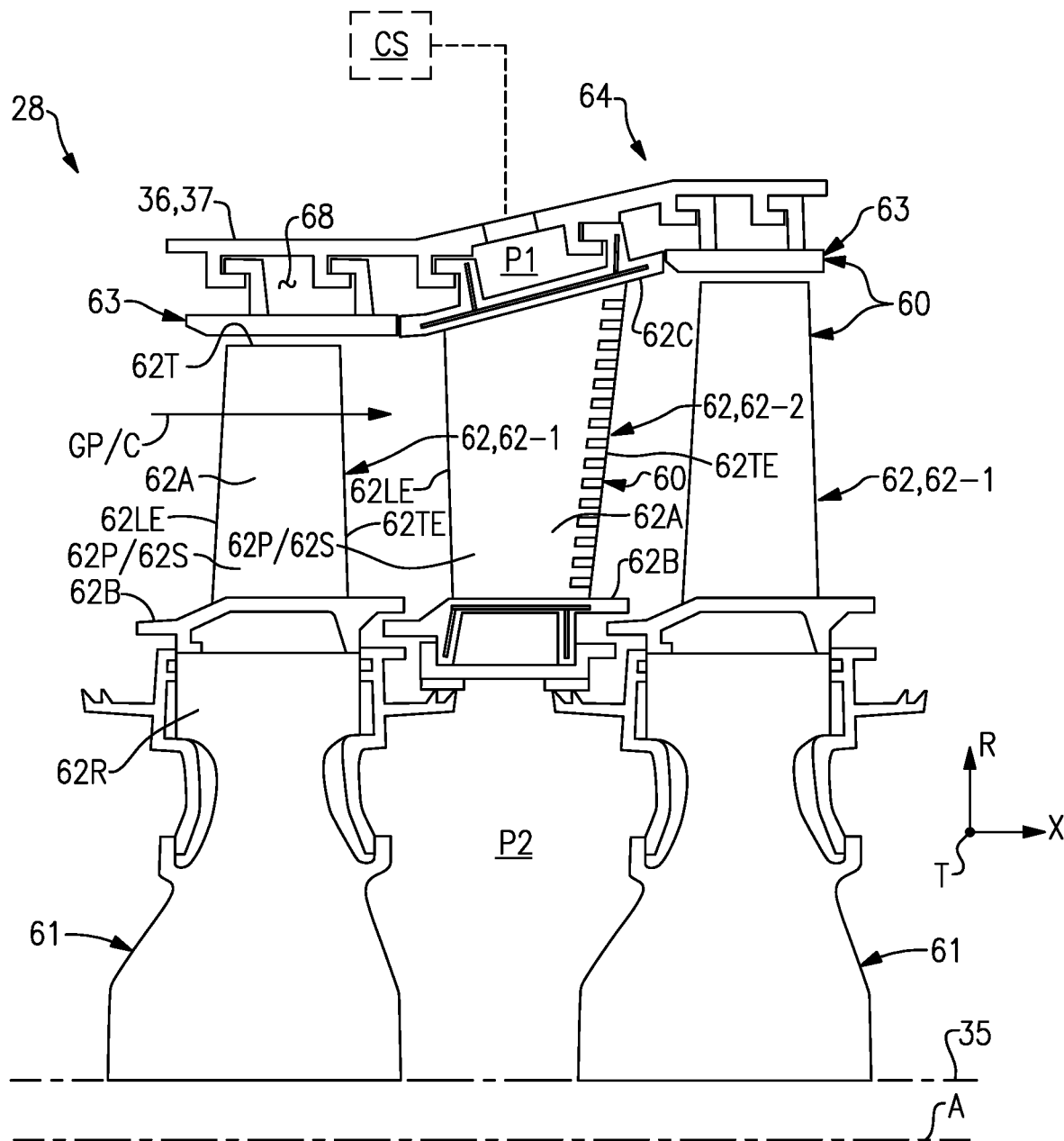
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24, combustor panels or liners and other components in the combustor section 26, and other portions of the engine 20 that may be subject to elevated temperature conditions during engine operation. Other systems can benefit from the teachings disclosed herein, including industrial gas turbine engines and other systems lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 28 includes a plurality of components 60 arranged relative to the engine axis A, including a rotor 61, one or more airfoils 62, and one or more blade outer air seals (BOAS) 63. Example airfoils 62 include blades 62-1 and vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first platform 62B. In the illustrative example of FIG. 2, each blade 62-1 extends in the radial direction R from the platform 62B to a tip 62T, and each vane 62-2 extends in the radial direction R from the first (e.g., inner) platform 62B to a second (e.g., outer) platform 62C. The platforms 62B, 62C bound or define a portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE. The root section 62R of the blade 62-1 is mounted to, or integrally formed with, the rotor 61. The vane 62-2 can be arranged to direct or guide flow in the gas path GP from and/or towards the adjacent blade(s) 62-1.

Each BOAS 63 can be spaced radially outward from the tip 62T of the blade 62-1. The BOAS 63 can include an array of seal arc segments that are circumferentially distributed or arranged in an annulus about an array of the airfoils 62 to bound the gas path GP. Alternatively, the BOAS 63 can be one continuous circumferential hoop.

The turbine section 28 includes at least one array of airfoils 62, including at least one array of blades 62-1 and at least one array of vanes 62-2, and at least one array of BOAS 63 arranged circumferentially about the engine axis A. The array of vanes 62-2 are spaced axially from the array of blades 62-1 along the engine axis A. The tips 62T of the blades 62-1 and adjacent BOAS 63 are arranged in close radial proximity to reduce the amount of gas flow that escapes around the tips 62T through a corresponding clearance gap.

The turbine section 28 includes a cooling arrangement 64 for providing cooling augmentation to the components 60 during engine operation. The cooling arrangement 64 includes one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more cooling sources CS (one shown) are configured to provide cooling air to the plenums P1, P2. The plenums P1, P2 are configured to receive pressurized cooling flow from the cooling source(s) CS to cool portions of the airfoils 62 and/or BOAS 63. Cooling sources CS can include bleed air from an upstream stage of the compressor section 24 (FIG. 1), bypass air, or a secondary cooling system aboard the aircraft, for example. Each of the plenums P1, P2 can extend in a circumferential or thickness direction T between adjacent airfoils 62 and/or BOAS 63.

Figure 3:
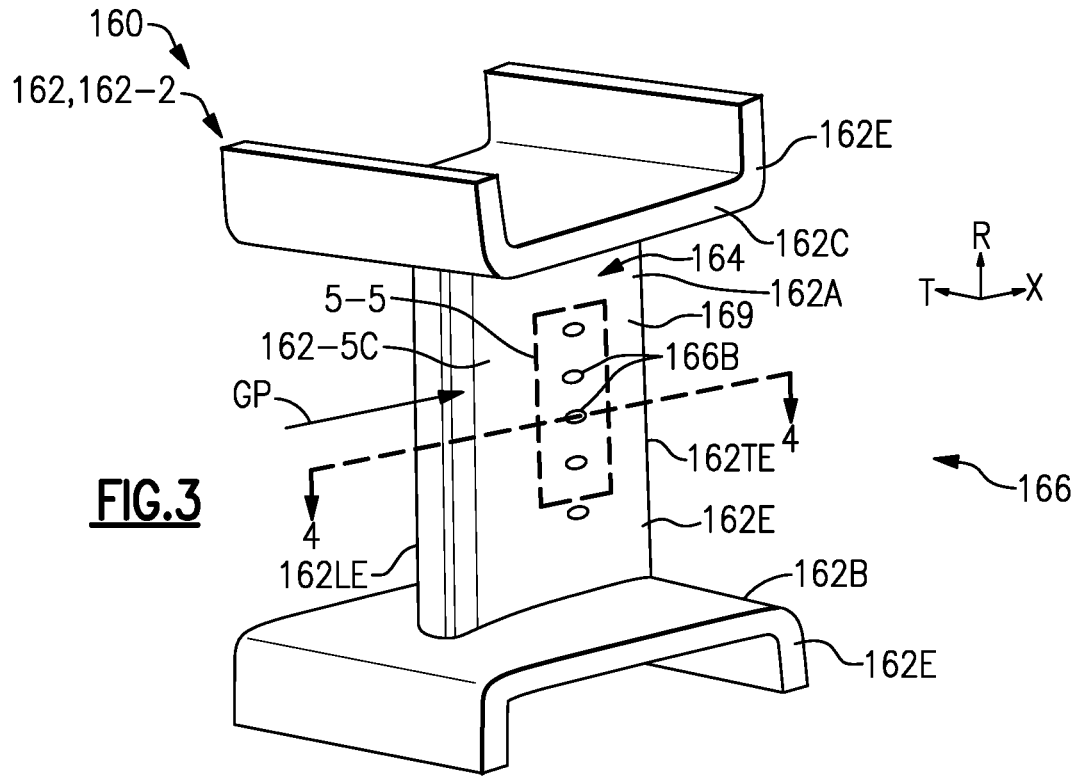
FIG. 3 illustrates a perspective view of an exemplary component including a cooling arrangement.
Figure 4:
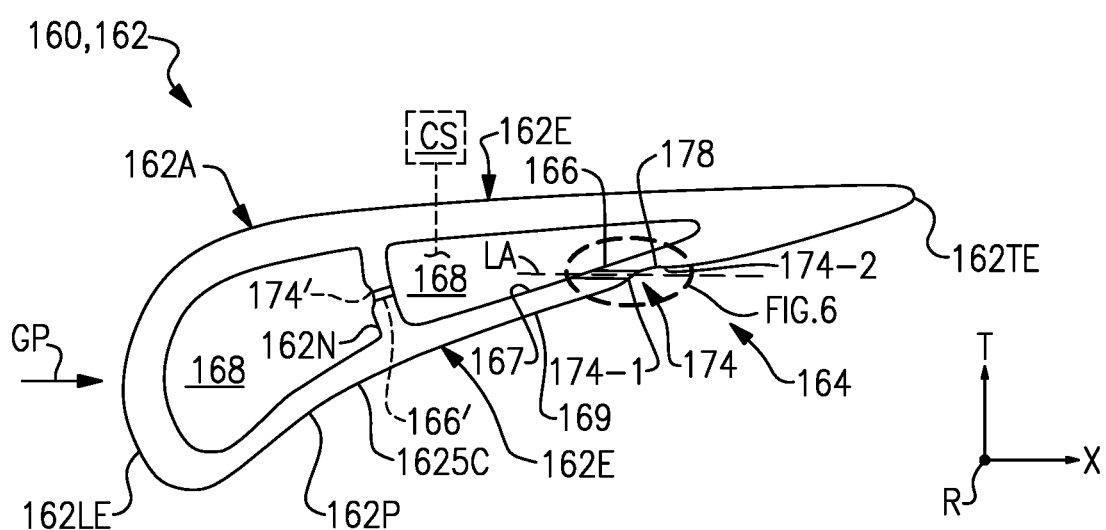
FIG. 4 illustrates a sectional view taken along line 4-4 of FIG. 3.

FIGS. 3-4 illustrate an exemplary gas turbine engine component 160 including a cooling arrangement 164. The component 160 can be a combustion liner incorporated into the combustor section 26, or a BOAS 63 or airfoil 62 such as a blade 62-1 or vane 62-2 incorporated into the turbine section 28 of FIG. 1, for example. In the illustrative example of FIG. 3, the component 160 is an airfoil 162 shown as a vane 162-2. The vane 162-2 can be a turbine vane incorporated into one or more rows of the turbine section 28 or the mid-turbine frame 57 of FIG. 1, for example.

Referring to FIG. 3, an airfoil section 162A extends from a platform 162B. In this example, the airfoil section 162A extends in a radial direction R between platforms 162B and 162C, and extends in a chordwise direction X between a leading edge 162LE and a trailing edge 162TE. The airfoil section 162A and platforms 162B, 162C include one or more external walls 162E and can include one or more internal walls 162N (FIG. 4) defined within a thickness of the airfoil section 162A and/or platform sections 162B and/or 162C.

Referring to FIG. 4, with continuing reference to FIG. 3, the external wall 162E extends in a thickness direction T between an internal (or first) wall surface 167 that bounds an internal cavity 168 and an external (or second) wall surface 169. The internal cavity 168 can be coupled to a cooling source CS (shown in dashed lines for illustrative purposes). Surfaces 169 along the external walls 162E establish an external surface contour 162SC that interacts with gases in a gas path GP during operation. Each internal cavity 168 may be a plenum formed by multiple parts or a cavity within a single part.

The cooling arrangement 164 is configured to provide cooling augmentation to adjacent portions of the component 160. The cooling arrangement 164 includes one or more cooling passages 166 in a thickness of the wall 162E. Each of the cooling passages 166 can be fluidly coupled to the cooling source CS. Each cooling passage 166 extends along a longitudinal axis LA between an inlet port 166A and an outlet port 166B, as illustrated in FIG. 6. A row of passages 166 can be arranged along the wall 162E, as illustrated by FIGS. 3 and 5.

In the illustrative example of FIG. 4, the internal wall 162N extends in the thickness direction T to bound the internal cavity 168. The internal wall 162N can be dimensioned to span between opposed external walls 162E. The internal wall 162N can include one or more cooling passages 166' (one shown in dashed lines for illustrative purposes) in a thickness of the wall 162N.

Referring to FIG. 6, with continuing reference to FIGS. 4 and 5, the cooling arrangement 164 includes one or more surface depressions 174 established along a wall of the component 160, such as the external wall 162E. In the illustrative example of FIGS. 3 and 5, the component 160 includes a plurality of surface depressions 174 distributed in a row along the external wall 162E. Surface depressions 174 can be formed along other portions of the component 160. For example, a surface depression 174' can be formed on a surface of the internal wall 162N, and at least one cooling passage 166' can extend from the surface depression 174', as illustrated in FIG. 4.

Each surface depression 174 can have various geometries. In the illustrative example of FIG. 6 (see also FIG. 7), the surface depression 174 has a substantially concave geometry established by an upstream (or first) arcuate face 174-1 and a downstream (or second) arcuate face 174-2 that each slope inwardly from opposed sides of a rim 176 along the external surface contour 162SC to join at a valley 178. The surface depression 174 expands outwardly from the valley 178 to establish a diffuser (or diffused region) 180.

Figure 7:
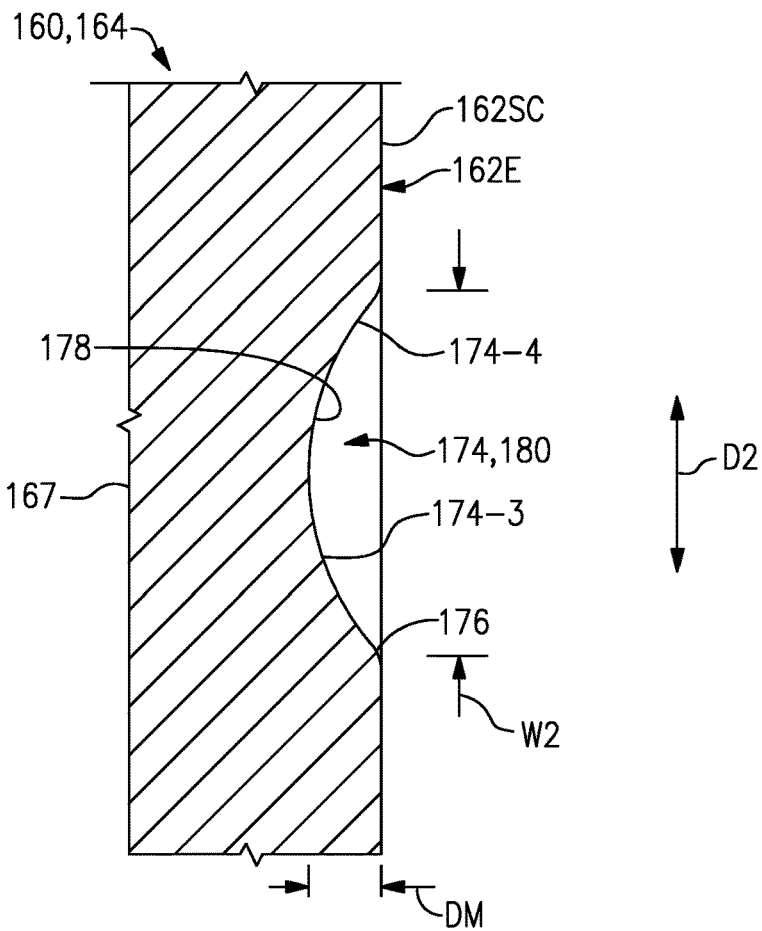
FIG. 7 illustrates a sectional view taken along line 7-7 of FIG. 5.

The rim 176 can have a substantially elliptical geometry that extends in a first direction D1 between the upstream and downstream arcuate faces 174-1, 174-2 to establish a first width W1, as illustrated in FIG. 6, and can extend in a second direction D2 between opposed sidewalls 174-3, 174-4 to establish a second width W2, as illustrated in FIG. 7. The first direction D1 can be perpendicular to the second direction D2. The first width W1 can establish a maximum distance across the rim 176, and the second width W2 can establish a minimum distance across the rim 176, as illustrated in FIG. 5, or vice versa. A cross section of the rim 176 can have a convexly-shaped geometry or profile established by one or more arc segments that interconnect the respective upstream and downstream arcuate faces 174-1, 174-2 and opposed sidewalls 174-3, 174-4 to the external surface contour 162SC, as illustrated in FIG. 6A. The convexly-shaped geometry of the rim 174 can establish a relatively smooth and continuous transition between the surface depression 174 and the external surface contour 162SC.

The cooling passage 166 can be oriented such that a projection of the longitudinal axis LA has a component that extends in the direction D1 towards the downstream arcuate face 174-2, as illustrated in FIG. 6. The direction D1 can correspond to the chordwise direction X such that the longitudinal axis LA extends towards the trailing edge 162TE, as illustrated in FIG. 4.

The cooling passage 166 is configured to interconnect the internal cavity 168 and a respective diffuser 180. The outlet port 166B can be established along the upstream arcuate face 174-1 of the surface depression 174, as illustrated in FIG. 6. The outlet port 166B can be situated between the valley 178 and the leading edge 162LE of the airfoil section 162A with respect to the chordwise direction X, as illustrated in FIG. 4. The outlet port 166B can be positioned at other locations. For example, the component 160 can include a passage 166' that extends between an inlet port 166A' and an outlet port 166B' such that the outlet port 166B' is established along the downstream arcuate face 174-2 of the surface depression 174 (shown in dashed line in FIG. 6 for illustrative purposes).

Each surface depression 174 can be coupled to at least one outlet port 166B of a respective cooling passage 166. In the illustrative example of FIG. 5, the rim 176 of each depression 174 circumscribes only one outlet port 166B. The rim 176 can circumscribe more than one outlet port 166B, as illustrated by rim 276 in FIG. 8. In the illustrative example of FIG. 8, surface depression 274 is a single continuous surface depression coupled to the outlet ports 266B of a plurality of cooling passages 266.

The component 160 can be made of various materials including metallic, composite and/or non-metallic materials. Example metallic materials include high temperature metals or alloys, such as nickel-based super alloy. Single crystal and directionally solidified metallic materials can be utilized. The component 160 can be made of a ceramic or ceramic matrix composite (CMC) material formed from one or more layers L of a CMC component layup. Each of the layers L can be arranged parallel to each other in a stacked relationship, as illustrated in FIG. 6. Each layer can include continuous and or discontinuous fiber orientations.

One or more coatings 186 (shown as dashed lines in FIG. 6 for illustrative purposes) can be distributed along the surface 169 of the external wall 162E. The coating 186 can include one or more layers. The coatings 186 can be made of various materials including metallic and/or non-metallic materials. The coating 186 can serve as a sealing coat to the underlying substrate, a bond or environmental barrier coating with one or more layers to protect the substrate from oxidation and recession, and/or a thermal barrier coating to at least partially insulate the component 160 from relatively hot gases in the gaspath GP (FIGS. 3-4) in operation.

The surfaces depression 174 can be dimensioned to establish various amounts of diffusion of cooling flow conveyed by the respective passage(s) 166. The valley 178 establishes a maximum depth DM of the surface depression 174 relative to the rim 176, as illustrated in FIGS. 6-7. The surface depression 174 can be dimensioned to be relatively shallow such that the maximum depth DM is less than both the first and second widths W1, W2. In another example, the maximum depth DM is greater than or equal to the first width W1 and/or the second width W2.

The cooling passage 166 can be oriented with respect to a geometry of the respective surface depression 174. A reference line L1 interconnects the valley 178 and a point P. Point P interconnects the downstream face 174-2 and rim 176 at a position associated with the first width W1. An angle α is established between the longitudinal axis LA and reference line L1. The angle α can be less than or equal to about 30 degrees, for example. For the purposes of this disclosure, the terms "substantially," "about," and "approximately" mean within ±3% of the stated value or relationship unless otherwise indicated. The passage 166 can be oriented such that the angle α can be less than or equal to about 15 degrees and the longitudinal axis LA is substantially parallel to the reference line L1.

Figure 8:
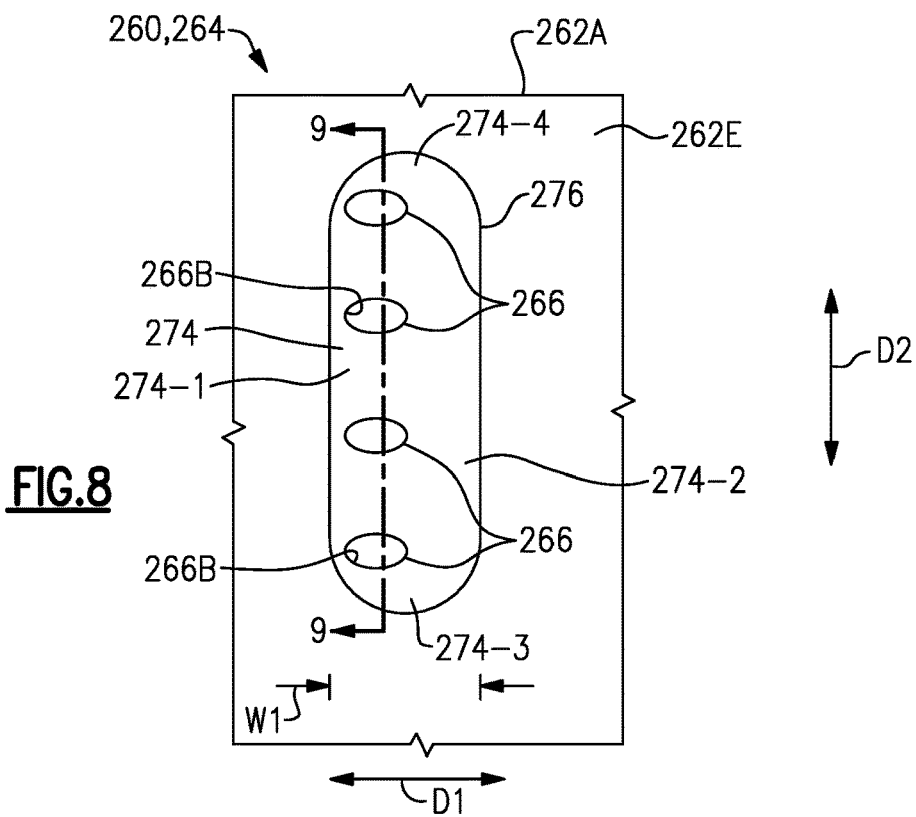
FIG. 8 illustrates a cooling arrangement according to another example.
Figure 9:
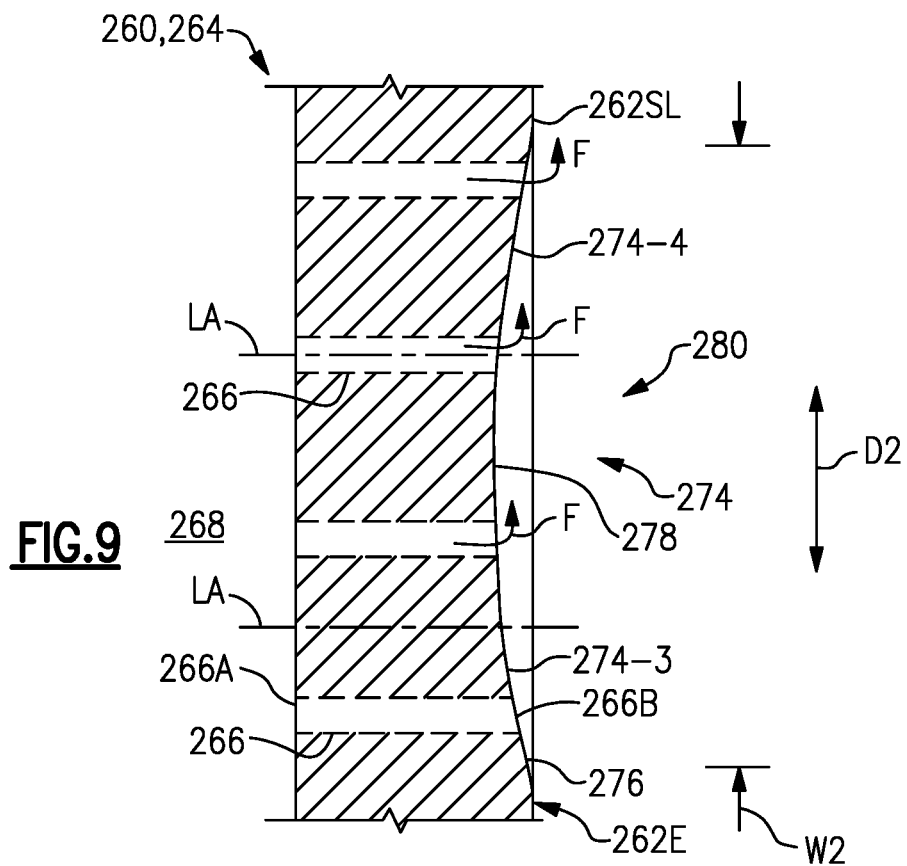
FIG. 9 illustrates a sectional view taken along line 9-9 of FIG. 8.

FIGS. 8 and 9 illustrate a gas turbine component 260 including a cooling arrangement 264 according to another example. Wall 262E includes a plurality of cooling passages 266 that each extend along a longitudinal axis LA between an inlet port 266A and outlet port 266B. The wall 262E includes a surface depression 274. The surface depression 274 can be coupled to each of the outlet ports 266B. The surface depression 274 is elongated such that a rim 276 of the surface depression 274 circumscribes two or more of the outlet ports 266B. In the illustrative example of FIG. 8, the surface depression 274 has a racetrack geometry, although other geometries can be utilized.

The surface depression 274 can have various cross-sectional geometries. In the illustrative example of FIG. 9, the surface depression 274 has a substantially concave geometry established by opposed sidewalls 274-3, 274-4 that each slope inwardly from opposed sides of the rim 276 along an external surface contour 262SC to a valley 278.

The rim 176 can extend in a first direction D1 between the upstream and downstream arcuate faces 274-1, 274-2 to establish a first width W1, as illustrated in FIG. 8, and can extend in a second direction D2 between opposed sidewalls 274-3, 274-4 to establish a second width W2, as illustrated in FIG. 9. The second width W2 can be more than twice the first width W1, for example.

The outlet port 266B can be established along the upstream arcuate face 274-1. The surface depression 274 expands outwardly from the valley 278 to establish a diffuser 280. The cooling passages 266 interconnect the internal cavity 268 and the diffuser 280, as shown in FIG. 9. The cooling passages 266 can convey cooling flow F (FIG. 9) to the diffuser 280 where it can at least partially intermix before exiting the surface depression 274, which may provide relatively uniform cooling augmentation and reduce thermal gradients, for example.

Figure 10:
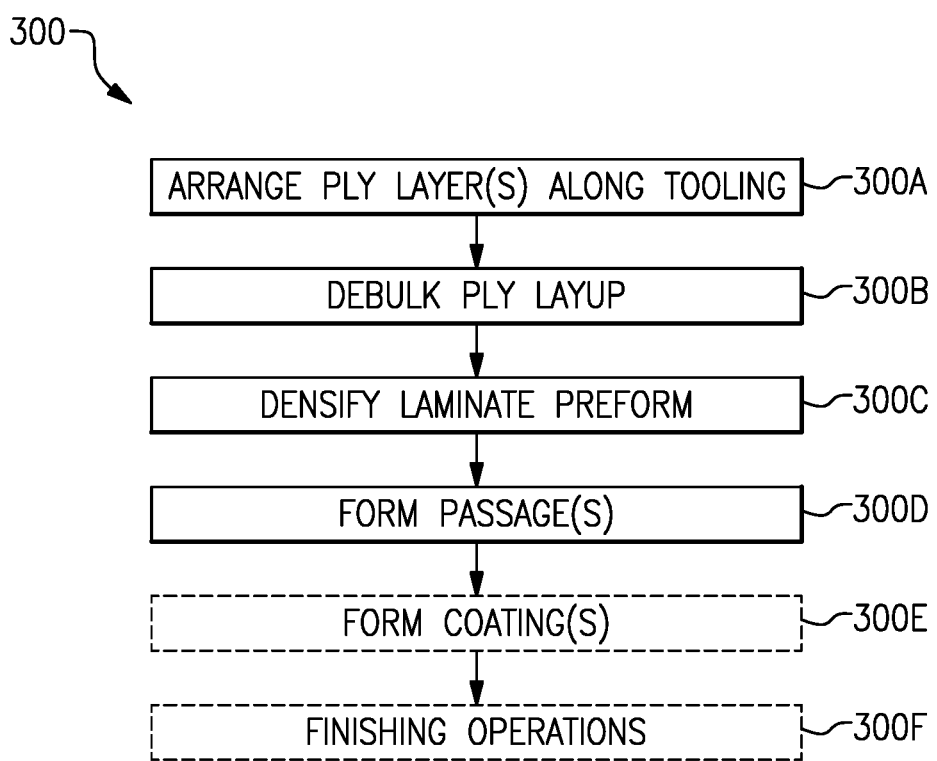
FIG. 10 illustrates a method of fabricating a component.
Figure 11:
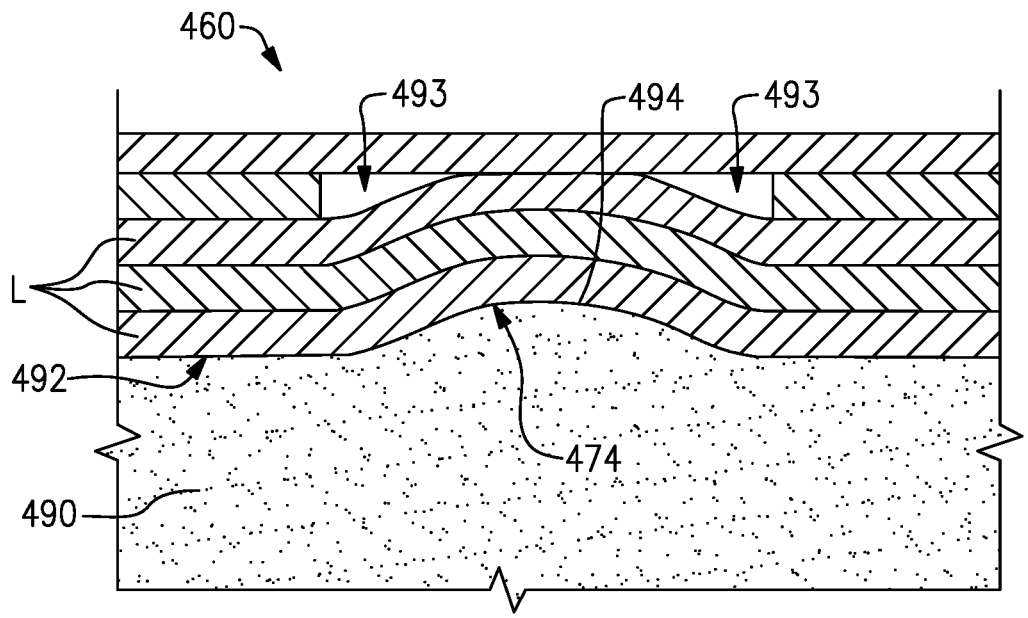
FIG. 11 illustrates one or more ply layers arranged on tooling.
Figure 12:
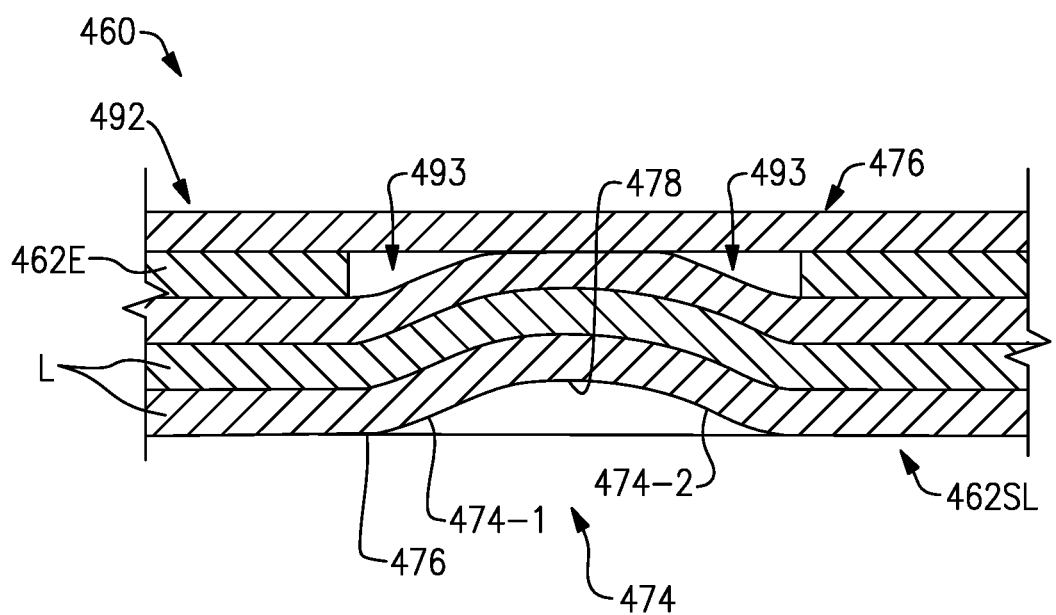
FIG. 12 illustrates a ply layup.
Figure 13:
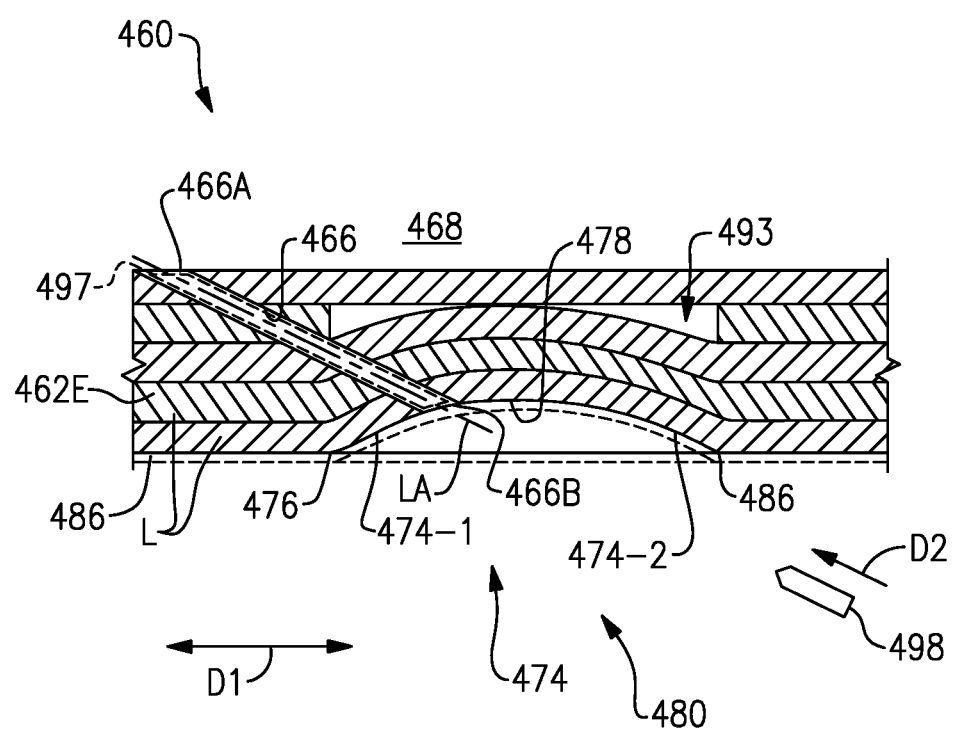
FIG. 13 illustrates a cooling passage formed in the ply layup.

FIG. 10 illustrates a method of fabricating or forming a component in a flowchart 300. The method 300 can be utilized to fabricate or form a gas turbine engine component, including any components disclosed herein, such as the components 160, 260. Reference is made to component 460 in FIGS. 11-13 for illustrative purposes. FIGS. 11-13 illustrate various stages in formation of the component 460.

Referring to FIG. 11, with continuing reference to FIG. 10, at step 300A one or more layers L are arranged along tooling 490 to establish a ply layup 492. The ply layup 492 can include one or more ply features 493, such as ply drops, local voids, or specific weave architectures in the layers L. The ply features 493 can be incorporated into the ply layup 492 such that a geometry of a wall of the component 460 bounding the internal cavity 468 has a generally planar geometry or otherwise differs from a contour of the surface depression 474, as illustrated in FIG. 11. The layers L are arranged to follow a contour of the tooling 490 established by a generally convexly-shaped raised protrusion 494 extending outwardly from a surface of the tooling 490. The layers L form at least one surface depression 474 that complements a geometry of the protrusion 494.

Referring to FIG. 12, with continuing reference to FIG. 10, at step 300B the ply layup 492 can be debulked to establish a laminate preform 496. In the debulking step, a volume of the preform 496 can be reduced, thus increasing an overall density of the layers L. Various debulking techniques can be utilized, such as compression in mechanical tooling, vacuum bagging, and mechanical tooling with vacuum assist. Debulking can be performed in single or multiple steps and at room or elevated temperatures.

At step 300C the laminate preform 496 can be densified to establish a densified preform which includes wall 462E of the component 460. Various densification techniques can be utilized, such as chemical vapor infiltration (CVI), melt infiltration (MI), polymer infiltration and pyrolysis (PIP), and combinations thereof. Target fiber volume fraction may be in the range of 35 to 45%. The wall 462E includes the surface depression 474 along a surface contour 462SC. A profile of the surface contour 462SC and surface depression 474 can substantially complement a profile of the tooling 500. The surface depression 474 has a substantially concave geometry established by an upstream (or first) arcuate face 474-1 and a downstream (or second) arcuate face 474-2 that each slope inwardly from opposed sides of a rim 476 along the external surface contour 462SC to join at a valley 478.

Referring to FIG. 13, with continuing reference to FIG. 10, at step 300D one or more cooling passages 466 (one shown for illustrative purposes) can be formed in the wall 462E. Various techniques can be utilized to form each passage 466, such as forming the passages 466 with a sacrificial member 497 (shown as dashed lines in FIG. 13 for illustrative purposes) having a geometry that complements the resultant passage 466. Other techniques can be utilized to form the passages 466, including laser drilling and machining using a tool 498. The cooling passages 466 can be dimensioned to interconnect the surface depression 474 and an internal cavity 468. The cooling passage 466 extends along a longitudinal axis LA between an inlet port 466A and outlet port 466B. The outlet port 466B can be established along the upstream face 474-1. The cooling passage 466 can be oriented such that a projection of the longitudinal axis LA has a component that extends in a direction D1 towards downstream face 474-2. The surface depression 474 is dimensioned to expand outwardly from valley 478 to establish a diffuser 480. The cooling passage 466 interconnects the internal cavity 468 and the diffuser 480.

At step 300E, one or more coatings 486 can be disposed or formed along the component 460 (shown in dashed lines for illustrative purposes). The coating 486 can have a profile that complements a profile of the component 460.

Referring to FIG. 10, at step 300F, one or more finishing operations can be performed. Example finishing operations can include machining and treating various surfaces of the component 460.

The cooling arrangements disclosed herein can be utilized to achieve high-film effectiveness, lower material temperatures, lower thru-thickness gradients, lower transient thermal gradients, improve durability (oxidation, recession, coating spallation, and structural capability), and reduce flow usage to maintain desired part thermal properties.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine component comprising:
an external wall extending in a thickness direction between first and second wall surfaces, the first wall surface bounding an internal cavity, the external wall surface establishing an external surface contour and at least one surface depression along the external surface contour, the at least one surface depression having concave geometry established by upstream and downstream arcuate faces sloping inwardly from opposed sides of a rim along the external surface contour to join at a valley, wherein the valley is established at a maximum depth of the at least one surface depression relative to the rim;
wherein the external wall includes at least one cooling passage extending along a longitudinal axis between an inlet port and an outlet port, the outlet port is established along the upstream face of the at least one surface depression, and the at least one cooling passage is oriented such that a projection of the longitudinal axis has a component that extends in a direction towards the downstream face; and
wherein the at least one surface depression expands outwardly from the valley to establish a diffuser, and the at least one cooling passage interconnects the internal cavity and the diffuser.

2. The gas turbine engine component as recited in claim 1, wherein the component is an airfoil, the airfoil includes an airfoil section extending in the chordwise direction between a leading edge and a trailing edge, and the outlet port is situated along the at least one surface depression between the valley and the leading edge of the airfoil section with respect to the chordwise direction.

3. The gas turbine engine component as recited in claim 2, wherein the external wall comprises a ceramic matrix composite including a plurality of ply layers in stacked relationship, and the plurality of ply layers follow the external surface contour to establish the at least one surface contour.

4. The gas turbine engine component as recited in claim 1, wherein the rim of the at least one surface depression has a substantially elliptical geometry that extends in a first direction between the upstream arcuate face and the downstream arcuate face to establish a first width and extends in a second direction between opposed sidewalls to establish a second width, the second direction is perpendicular to the first direction, and the at least one surface depression is dimensioned such that the maximum depth is less than both the first and second widths.

5. The gas turbine engine component as recited in claim 4, wherein the first width is a minimum distance across the rim and the second width is a maximum distance across the rim.

6. The gas turbine engine component as recited in claim 1, wherein the upstream face and downstream face establish a first width along the rim, opposed faces of the at least one surface depression establish a second width along the rim, and the at least one surface depression is elongated such that the first width is greater than the second width.

7. The gas turbine engine component as recited in claim 1, wherein the at least one cooling passage includes a plurality of cooling passages, the at least one surface depression is a plurality of surface depressions distributed along the external wall, and each surface depression of the plurality of surface depressions is coupled to the outlet port of a respective one of the plurality of cooling passages.

8. The gas turbine engine component as recited in claim 7, wherein each surface depression of the plurality of surface depressions circumscribes only one outlet port of the plurality of cooling passages.

9. The gas turbine engine component as recited in claim 7, wherein the at least one surface depression is a single continuous surface depression coupled to the outlet ports of the plurality of cooling passages.

10. The gas turbine engine component as recited in claim 1, wherein a cross section of the rim has a convexly shaped geometry that interconnects the respective upstream and downstream faces and the external surface contour.

11. The gas turbine engine component as recited in claim 1, wherein the gas turbine engine component is an airfoil including an airfoil section extending from a platform section.

12. A gas turbine engine comprising:
an array of blades and an array of vanes spaced axially from the array of blades in a gas path, the array of blades rotatable in the gas path, and an array of blade outer air seals (BOAS) arranged about the array of blades to bound the gas path; and wherein at least one of the array of blades, the array of vanes and the array of BOAS comprises:

an external wall extending in a thickness direction between first and second wall surfaces, the first wall surface bounding an internal cavity, the external wall surface establishing an external surface contour and at least one surface depression along the external surface contour, and the at least one surface depression having concave geometry established by upstream and downstream faces that slope inwardly from opposed sides of a rim along the external surface contour to join at a valley, wherein the valley is established at a maximum depth of the at least one surface depression relative to the rim; and wherein the external wall includes at least one cooling passage extending along a longitudinal axis between an inlet port and an outlet port, the outlet port is established along the upstream face of the at least one surface depression, the at least one cooling passage is oriented such that a projection of the longitudinal axis has a component that extends in a direction towards the downstream face, wherein the at least one surface depression expands outwardly from the valley to establish a diffuser, and the at least one cooling passage interconnects the internal cavity and the diffuser.

13. The gas turbine engine as recited in claim 12, wherein the component is an airfoil, the airfoil includes an airfoil section extending in a chordwise direction between a leading and trailing edge, and the outlet port is established between the valley and the leading edge with respect to the chordwise direction.

14. The gas turbine engine as recited in claim 12, wherein the rim of the at least one surface depression has a substantially elliptical geometry that extends in a first direction between an upstream edge and a downstream edge to establish a first width and extends in a second direction between opposed sidewalls of the at least one surface depression to establish a second width, the second direction perpendicular to the first direction, and the at least one surface depression is dimensioned such that the maximum depth is less than the first width and is less than the second width.

15. The gas turbine engine component as recited in claim 14, wherein a reference line interconnects the valley and a point along the rim associated with the first width, and an angle is defined between the longitudinal axis relative to the reference line, and the angle is less than or equal to 15 degrees.

16. The gas turbine engine component as recited in claim 12, wherein the at least one surface depression includes a plurality of surface depressions spaced apart along the external wall.

17. The gas turbine engine as recited in claim 12, wherein the upstream face and downstream face establish a first width along the rim, opposed faces of the at least one surface depression establish a second width along the rim, and wherein the surface depression is elongated such that the first width differs from the second width.

18. The gas turbine engine as recited in claim 12, wherein the at least one cooling passage includes a plurality of cooling passages, the at least one surface depression is a plurality of surface depressions spaced apart along the external wall to establish the external surface contour, and each surface depression of the plurality of surface depressions circumscribes only one outlet of the plurality of cooling passages.

19. A method of fabricating a gas turbine engine component comprising:

arranging one or more plies along tooling to establish a ply layup including at least one surface depression that complements a raised protrusion along the tooling;

debulking the ply layup to establish a laminate preform;

densifying the laminate preform to establish a wall of a gas turbine engine component including a surface contour, wherein the at least one surface depression is established along the surface contour, and the at least one surface depression having concave geometry established by upstream and downstream faces that slope inwardly from opposed sides of a rim along the surface contour to join at a valley, wherein the valley is established at a maximum depth of the at least one surface depression relative to the rim; and forming at least one cooling passage that interconnects the at least one surface depression and an internal cavity, wherein the at least one cooling passage extends along a longitudinal axis between an inlet port and an outlet port, the outlet port is established along the upstream face, the at least one cooling passage is oriented such that a projection of the longitudinal axis has a component that extends in a direction towards the downstream face, the at least one surface depression expands outwardly from the valley to establish a diffuser, and the at least one cooling passage interconnects the internal cavity and the diffuser.

20. The method as recited in claim 19, wherein:

the gas turbine engine component is an airfoil;

the one or more ply layers includes a plurality of ply layers in stacked relationship to establish the ply layup; and the step of densifying the laminate preform establishes a ceramic matrix composite (CMC).

21. The method as recited in claim 19, wherein the step of forming the at least one cooling passage includes forming the passage with a sacrificial member or machining the at least one cooling passage into the upstream face of the at least one surface depression.

* * * * *